United States Patent
Bennett et al.

(10) Patent No.: US 8,284,233 B2
(45) Date of Patent: Oct. 9, 2012

(54) UTILIZING IMAGE SEQUENCES TO PERFORM VIDEO STREAMING DURING VIDEO CONFERENCING

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 890 days.

(21) Appl. No.: 12/366,988

(22) Filed: Feb. 6, 2009

(65) Prior Publication Data

US 2010/0201780 A1    Aug. 12, 2010

(51) Int. Cl.
*H04N 7/14* (2006.01)

(52) U.S. Cl. .......... 348/14.1; 348/14.11; 348/14.12; 348/14.14; 348/14.15; 348/14.16; 348/14.08; 348/14.09

(58) Field of Classification Search .......... 348/474, 348/14.1, 14.16; 704/276, 260, 258, 270, 704/275; 455/412.1, 557, 566; 709/219; 370/419

See application file for complete search history.

(56) References Cited

U.S. PATENT DOCUMENTS

| | | | |
|---|---|---|---|
| 5,359,362 A * | 10/1994 | Lewis et al. ................... | 348/14.1 |
| 7,203,648 B1 * | 4/2007 | Ostermann et al. ........... | 704/260 |
| RE42,210 E * | 3/2011 | Osann, Jr. ................... | 455/556.1 |
| 2002/0031139 A1 * | 3/2002 | Yoshizawa .................... | 370/419 |
| 2002/0049534 A1 * | 4/2002 | Yuda et al. .................... | 701/209 |
| 2004/0203608 A1 * | 10/2004 | Osann, Jr. ................... | 455/412.1 |
| 2006/0176396 A1 * | 8/2006 | Choi et al. .................... | 348/474 |
| 2007/0162569 A1 * | 7/2007 | Robinson et al. ............. | 709/219 |
| 2008/0070697 A1 * | 3/2008 | Robinson et al. .............. | 463/42 |
| 2008/0298571 A1 * | 12/2008 | Kurtz et al. .................... | 379/156 |
| 2009/0125312 A1 * | 5/2009 | Hwang et al. ................. | 704/276 |

* cited by examiner

*Primary Examiner* — Joseph J Nguyen
(74) *Attorney, Agent, or Firm* — Brinks Hofer Gilson & Lione

(57) ABSTRACT

A communication device is operable to construct one or more image sequences that correspond to voice information, where the image sequences simulate video streaming via the communication device. The image sequences are synchronized with the voice information during active video based connection via the communication device. The image sequences are generated and/or retrieved within the communication device, and/or retrieved from an external source. At least some of the images may be generated via a secondary device that is communicatively coupled with the communication device. The generated images are stored within the secondary device and/ or are stored in a dedicated video support server. The secondary device is operable to communicate the images directly during communication with the communication device and/ or to communication information that enable retrieving and/ or constructing the image sequences. Alternatively, the communication device is operable to generate the image sequences independently.

10 Claims, 8 Drawing Sheets

| Mouth Image Storage | Normal Open | Normal 3/4 Open | Normal Half Open | Normal 1/4 Open | Normal Closed | Open Smile | 3/4 Open Smile | Half Open Smile | 1/2 Open Smile | Closed Smile | Shock | Frown | Pronouncing 'a' | ... |

*FIG. 2A*

UTILIZING IMAGE SEQUENCES TO PERFORM VIDEO STREAMING DURING VIDEO CONFERENCING

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and system for utilizing image sequences to perform video streaming during video conferencing.

BACKGROUND OF THE INVENTION

The growth of system connectivity has been one of the major developments in recent years. Fewer and fewer systems are operating as stand-alone system, and most of today's systems are increasingly becoming elements of one or more larger or complex networks. This growth in various networking technologies have provided improved performance and increased flexibility for these networks. Various wired and/or wireless based communication standards have been developed to satisfy demands for ever expanding system connectivity. The growth of system connectivity has also spurred a growth in applications that takes advantage of the benefits offered by the improved system connectivity, especially those having access to entities that provides improved processing and/or storage capabilities.

Communication end-point devices, which are mobile and/or stationary, comprise a plurality of wireless technologies to enable use of various interfaces for transmitting and/or receiving data. For example, mobile devices, which enable cellular connectivity, have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, CDMA2000, and LTE, incorporate substantial data capabilities. Most of today's mobile services comprise such features as text messaging, audio/video streaming, and web browsing. Modern mobile devices, for example cell phones and/or smart phones, are utilized to support additional services via other wireless interfaces, for example, wireless personal area networks (WPAN) and/or wireless local area network (WLAN) interfaces.

The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). An exemplary WPAN system utilizes a standardized technology such as Class 2 Bluetooth (BT) technology. While WPAN may be very beneficial for certain applications, other applications may require larger service areas and/or capabilities. To satisfy such needs, other technologies such as Wireless local area networks (WLAN) have been developed to provide greater wireless service. In contrast to the WPAN systems, WLAN provide connectivity to devices that are located within a slightly larger geographical area, such as the area covered by a building or a campus, for example.

WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system. Some WLAN systems are operated in conjunction with WPAN systems to provide users with an enhanced overall functionality. For example, Bluetooth technology may be utilized to connect a laptop computer or a handheld wireless terminal to a peripheral device, such as a keyboard, mouse, headphone and/or printer, while the laptop computer or the handheld wireless terminal is also connected to a campus-wide WLAN network through an access point (AP) located within the building. Also, mobile technology enables the use of the mobile phone as a form of wireless modem that allows connecting a laptop, for example, to the internet via a mobile network. More recently, Worldwide Interoperability for Microwave Access (WiMAX) based systems have become popular, and use of WiMAX to provide wireless connectivity is expanding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing image sequences to perform video streaming during video conferencing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2A is a block diagram that illustrates an exemplary image sequence storage element that enables simulating mouth movement, in accordance with an embodiment of the invention.

DETAILED DESCRIPTION OF THE INVENTION

Certain embodiments of the invention may be found in a method and system for utilizing image sequences to perform video streaming during video conferencing. In various embodiments of the invention, a communication device is operable to construct one or more image sequences that correspond to voice information, where the image sequences simulate video streaming via the communication device. The image sequences are synchronized with the voice information during an active video based connection via the communication device. Various synchronization methods are utilized, including, for example, speech recognition and/or image mapping based on voice codebooks that are utilized in voice coding schemes. The image sequences are generated dynamically during active calls, are pre-generated and stored within the communication device for subsequent use, and/or are retrieved from an external source. At least some of the images may be generated via a secondary device that is operable to become communicatively coupled with the communication device. The generated images are stored within the secondary device and/or are stored in a dedicated video support server where they may be retrieved by the communication device. The secondary device is operable to communicate the images directly during communication with the communication device and/or by communicating information that enables the communicative device to retrieve and/or construct the image sequences. The images and/or the information are encoded, for example, into the encoded voice stream. Alternatively, the communication device is operable to generate the image sequences independently, by utilizing a comic avatar to substitute for video streaming. The image sequences may comprise a plurality of reference frames and a plurality of positional images that enable simulate one or more facial movements, expression, and/or alterations. Mouth position images are operable, for example, to simulate mouth movement during simulated video streaming, where the mouth position images are mapped to the voice information to perform said synchronization of said image sequences. The matching of mouth position images to voice information may be pre-processed, and image tags may be utilized to enable quick and efficient mapping.

Figure 1A:
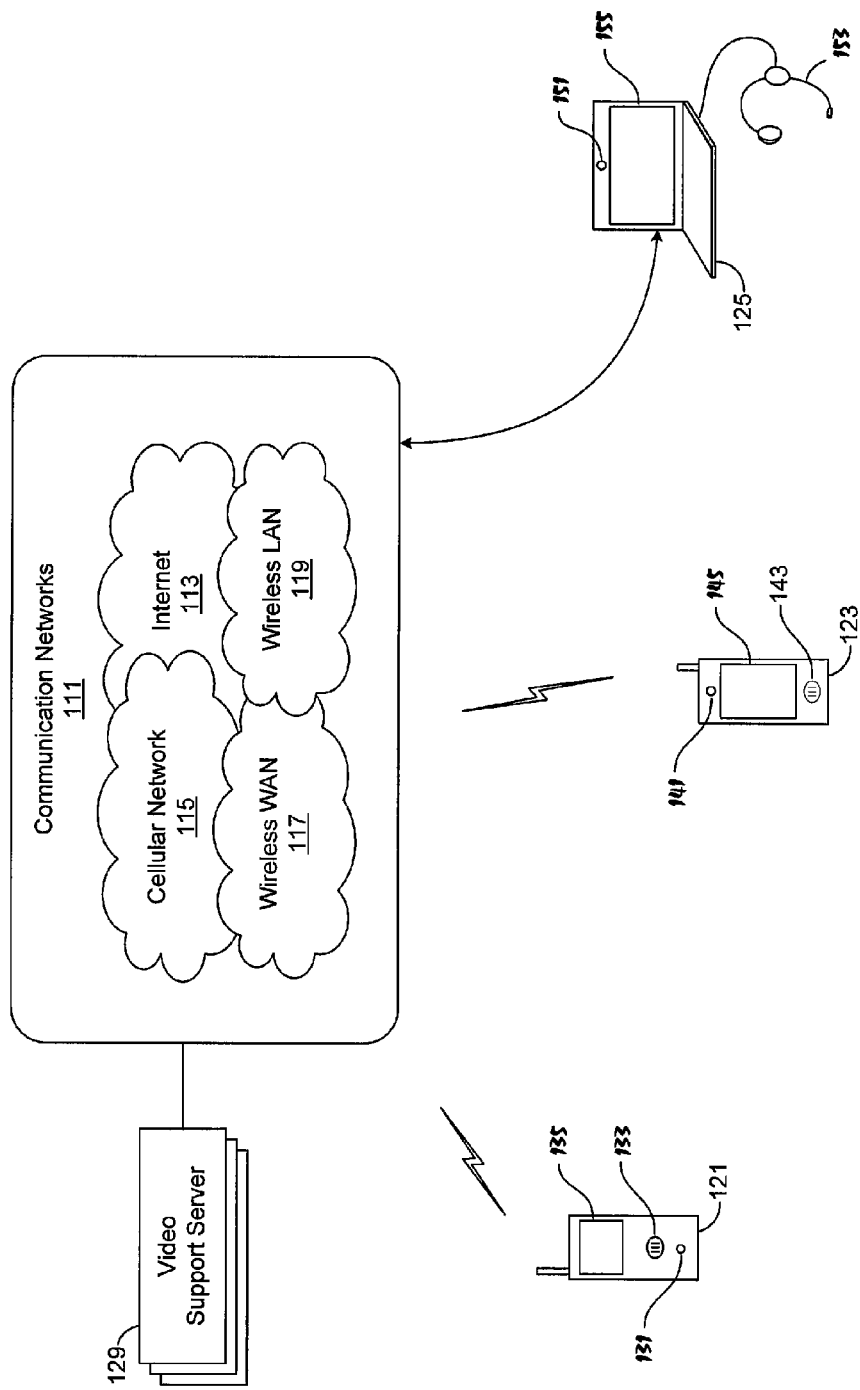
FIG. 1A is a block diagram that illustrates an exemplary setup that enables using video conferencing, in accordance with an embodiment of the invention.

FIG. 1A is a block diagram that illustrates an exemplary setup that enables using video conferencing, in accordance with an embodiment of the invention. Referring to FIG. 1A, there is shown a plurality of communication networks 111, Internet 113, a cellular network 115, a wireless wide area network (WWAN) 117, a wireless local area network (WLAN) 119, plurality of communication devices 121, 123 and 125, and one or more video support server 129.

The plurality of communication networks 111 comprises one or more networks that are operable to enable wireless and/or wired communication among a plurality of local and/or remote entities. The network connectivity available via the plurality of communication networks 111 is based on one or more communication standards and/or protocols. The plurality of communication networks 111 comprises, for example, the Internet 113, the cellular network 115, the WWAN 117 and/or the WLAN 119.

The Internet 113 comprises a system of interconnected networks to enable exchange of data between a plurality of nodes, based on one or more networking standards, including, for example, the Internet protocol (IP). The physical connectivity is provided in the Internet 113, for example, via the Public Switched Telephone Network (PSTN), via copper wires, fiber-optic cables, wireless interface and/or other standards-based interfaces. The transport functionality is performed in the Internet 113, for example, based on one or more protocols, including, for example, the TCP/IP protocol.

The cellular network 115 is operable to enable communication and/or connectivity via one or more cellular technologies. Exemplary cellular technologies comprise CDMA, WCDMA, CDMA1000, HSDPA, GSM, GPRS, EDGE and/or UMTS. The WWAN 117 is operable to enable communication and/or connectivity via one or more wireless wide network area standards and/or protocols. Exemplary wireless wide network area technologies comprise, for example, WiMAX based networks. The WLAN 119 is operable to enable communication and/or connectivity via one or more wireless local network area standards and/or protocols. Exemplary wireless local network area technologies comprise, for example, IEEE 802.11 based interfaces.

Each of the communication devices 121, 123 and 125 comprises a personal user-end device that is operable to enable performing tasks and/or applications requested via device users. The communication devices 121, 123 and 125 are operable to enable network connectivity, via one or more of the communication networks 111 for example, through one or more wireless and/or wired interfaces. The communication devices 121, 123 and/or 125 are operable, for example, to use Ethernet links, fiber optical links, cellular links, WiMAX links and/or 802.11 links to establish network connectivity via the Internet 113, cellular network 115, the WWAN 117 and/or the WLAN 119, respectively, to form communication pathways that support one or more applications originating and/or terminating in the devices. Exemplary devices comprise a PDA, a Smartphone, a laptop and/or a PC that are operable to enable utilizing one or more wired and/or wireless communication interfaces. In an exemplary aspect of the invention, the communication devices 121, 123 and/or 125 may be operable to enable audiovisual interactions during communication sessions, which may comprise video conference calls. For example, the communication device 121 may comprise a camera 131, a microphone/speaker 133, and a display screen 135.

The camera 131 is operable to capture still pictures and/or video streams. The microphone/speaker 133 is operable to capture audio streams, generated by a device user for example and/or to playback audio streams received and/or generated via the communication device 121. The screen 135 is operable to playback still pictures and/or video streams. The communication device 123 is similarly operable to utilize a camera 141, a microphone/speaker 143 and/or display screen 145 to enable audio/video interactions via the communication device 123. The communication device 125 may also comprise a camera 151, a headset 153 and/or a screen 155 to enable audio/video interactions via the communication device 125.

The video support server 129 comprises suitable logic, circuitry and/or code to provide and/or manage video streaming operations during communication sessions between two or more communication devices. The video support server 129 is operable, for example, to store existing image sequence, and to enable retrieval of the image sequences by a communication device during communication session to facilitate simulating video streaming during video conference call.

In operation, the communication devices 121, 123 and/or 125 are operable to obtain network connectivity through one or more of the plurality of the communication networks 111, via one or more wired and/or wireless links. The network connectivity is established, for example, via a WiMAX wireless link, a cellular link, an 802.11 link, an Ethernet based wired connection and/or fiber optical cables. The communication devices 121, 123 and/or 125 are operable to enable establishing communication sessions that provide audiovisual interactions. For example, a communication session may be established between the communication devices 121 and 125, via one or more the communication networks 111. During such communication session, audio streams are captured by and playback via the microphone/speaker 133 and the headset 153. In addition, the cameras 131 and/or 151 are operable to capture images and/or video streams that are playable via the screen displays 155 and/or 135.

Various considerations, however, may limit availability of and/or use of video streaming during such communication sessions. For example, bandwidth constraints, costs and/or the intrusive nature of video generation may militate against use of actual and/or real time video streams during communication sessions between the communication devices. In an embodiment of the invention, image sequences are utilized in the receiving communication device to simulate video streams during communication sessions. Use of image sequences may reduce bandwidth requirements because small number of still images, for example, may be utilized via processing operations in the destination device to generate simulated video stream representing the sending device's user. For example, where bandwidth constraints prevent or deter against transmission of video streams from communication device 121 to the communication device 125 during a communication session between the two device, the communication device 125 is operable to utilize image sequences to generate simulated video streams representing, for example, a user of the communication device 121 who is participating in the communication session.

Various methods may be utilized to enable generation and/or use of image sequences that provide simulated video streaming functionality in the receiving communication device. The image sequences may be generated real-time in the sending communication device. For example, during communication sessions between the communication device 121 and the communication device 123, the communication device 121 is operable to capture, via the camera 131, a sequence of still images of the device user. The images may then be communicated, separately and/or embedded within data stream carrying the audio information, from the communication device 121 to the communication device 123. The image sequences may also be generated in the communication devices and subsequently used during communication sessions, where bandwidth limitations necessitate such use and/or based on a user request. For example, the communication device 125 is operable to enable a user of the communication device 121 to generate image sequences, via the camera 155, corresponding to the user during communicative idle states. The image sequences may then be processed and/or customized, if necessary, based on the user's feedback, and stored. Exemplary processing and/or customization may comprise cropping, rotating, skewing, changing color, contrast and/or tone, editing, scaling, reordering and/or otherwise modifying the image sequences.

In subsequent communication session, for example with the communication device 123, the user may request, where it may be inconvenient to utilize real time video streaming for example, that the image sequences be used in lieu of actual video streams. The previously generated image sequences are then communication to enable generating simulated video streams corresponding to the audio stream in the communication device 123. In an embodiment of the invention, the destination communication device is also operable to generate image sequences independently. For example, in instances where the communication device 125 is only receiving audio information from the communication device 121 during a communication session between the two devices, the communication device 125 may be operable to generate avatar sequences that are then used to simulate video streaming corresponding to the audio stream. The avatar sequences may be based on, for example, previously existing real images of the user of the communication device 121. Alternatively, the avatar sequences may comprise comic representation that is specified by either of the users.

In an exemplary aspect of the invention, the video support server 129 is operable to support use of image sequences to simulate video streaming during communication sessions between the communication devices 121, 123 and/or 125. For example, in instances where the image sequences are generated in the communication device 121 during idle periods and/or states, the image sequences are then uploaded into the video support server 129, for example, when it is advantageous to do so without significant cost and/or detrimental use of the available bandwidth. This may occur during off-peak usage periods. During communication session between the communication devices 121 and 123, the communication device 123 is operable to retrieve the image sequences from the video support server 129. To facilitate such storage and retrieval operations, the image sequences may be assigned unique identifiers to enable archiving these sequences in the video support server 129. The identifiers are then provided to the communication device 123 to enable that device to retrieve the correct image sequences form the video support server 129. Exemplary identifiers comprise user created names and tags, and/or automatically generated identifiers. Automatically generated identifiers comprise location information generated from a global navigational satellite system (GNSS) receiver such as a GPS receiver, a GLONASS receiver and a GALILEO receiver. Automatically generated identifiers also comprise information generated from a biometric sensor.

Figure 1B:
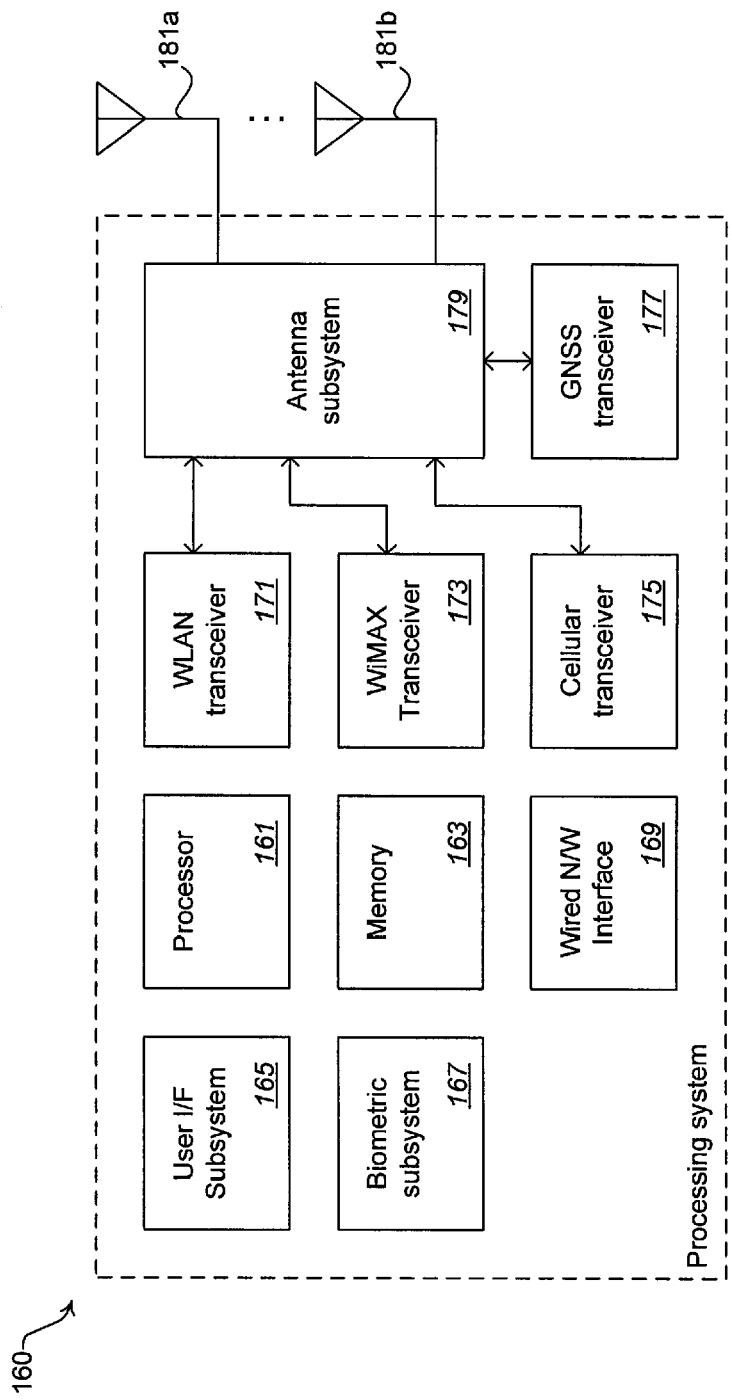
FIG. 1B is a block diagram of an exemplary processing system that is operable to enable utilizing image sequences to facilitate video streaming during video based communication, in accordance with an embodiment of the invention.

FIG. 1B is a block diagram of an exemplary processing system that is operable to enable utilizing image sequences to facilitate video streaming during video based communication, in accordance with an embodiment of the invention. Referring to FIG. 1B, there is shown a processing system 160, a processor 161, a memory 163, a user interface (I/F) subsystem 165, a biometric subsystem 167, a wired networking (NW) interface 169, a cellular transceiver 175, a WLAN transceiver 171, a WiMAX transceiver 173, a GNSS transceiver 177, an antenna subsystem 179, and a plurality of antennas 181a, . . . , 181b.

The processing system 160 is operable to support a plurality of wired and/or wireless interfaces, and to enable interactions with device users to facilitate generation and/or use of image sequences to simulate video streaming, in accordance with an embodiment of the invention. The processing system 160 comprises the processor 161, the memory 163, the user I/F subsystem 165, the biometric subsystem 167, the wired network interface 169, the cellular transceiver 175, the WLAN transceiver 171, the WiMAX transceiver 173, the GNSS transceiver 177, the antenna subsystem 179, and the plurality of antennas 181a, . . . , 181b. The processing system 160 also comprise suitable logic, circuitry and/or code that may enable facilitating, managing and/or controlling communication operations via a plurality of wireless and/or wired interfaces. The processing system 160 is also operable to enable interactions with users to facilitated generating and/or using images that may be used to construct image sequences to facilitate simulating video streaming during video calls. The processing system 160 may be integrated within a device, for example the communication devices 121, 123 and/or 125, to enable performing communication and/or simulating of video streaming operations, substantially as described with regards to FIG. 1A.

The processor 161 comprises suitable logic, circuitry and/or code that enable control and/or data processing operations in the processing system 160. The processor 161 is utilized to control at least a portion of the memory 163, the user I/F subsystem 165, the biometric subsystem 167, the wired network interface 169, the cellular transceiver 175, the WLAN transceiver 171, the WiMAX transceiver 173, the GNSS transceiver 177 and/or antenna subsystem 179. In this regard, the processor 161 generates, for example, at least one or more signals for controlling operations within the processing system 160. The processor 161 may also enable execution of applications that may be utilized by the processing system 160.

The memory 163 comprises suitable logic, circuitry and/or code that may enable storage of data, code and/or other information utilized by the processing system 160. For example, the memory 163 is utilized for storing generated and/or received data and/or execution code that is utilized by the processor 161. The memory 163 is also utilized to store information, such as configuration information, that is utilized to control the operation of at least a portion of the processing system 160. For example, the memory 163 comprises information necessary to configure the cellular transceiver 175, the WLAN transceiver 171, the WiMAX transceiver 173 and/or the GNSS transceiver 177, to enable transmission and/or reception of RF signals in appropriate frequency bands.

The user I/F subsystem 165 comprises suitable logic, circuitry and/or code that is enabled to facilitate interactions with users of devices that comprise the processing system. For example, in instances where the processing system is integrated within the communication device 121, the user I/F subsystem 165 is operable to enable prompting device users, via the screen 135 for example, for commends and/or input. The user I/F subsystem 165 is also operable to enable receiving user's input, which is provided, for example, via keypad and/or the microphone/speaker 133. The user input may then be processed and utilized, to facilitate tagging of images and/or generation of image sequences for example.

The biometric subsystem 167 comprises suitable logic, circuitry and/or code that enable managing, processing and/or utilizing biometric data. The biometric subsystem 167 also comprises one or more sensors that operable to capture and/or validate biometric data. Exemplary sensors may comprise retina readers or scanners, finger prints scanners and/or voice recognition functions. Biometric data, which may comprise finger prints, retina data, or behavioral patterns, may be unique to a person. The biometric data may be classified into two main types: physiological and behavioral biometric data. The physiological biometric data may be related to the physical aspect of the body such as facial features, finger prints, hand shape, iris blood vessel pattern (iris scan) and DNA sequences. The behavioral biometric data may be related to the expression of personality such as Electroencephalogram (EEG) that senses and measures brain wave activities, signature, hand writing and voice. Therefore the biometric data may be representative of the actual person or user.

The wired network interface 169 comprises suitable logic, circuitry, and/or code that may enable processing of network traffic received and/or transmitted via wired based network connections, for example Ethernet connections. The WLAN transceiver 171 comprises suitable logic, circuitry and/or code that may enable performing WLAN communications. Exemplary WLAN interfaces comprise 802.11 interfaces. The WLAN transceiver 175 is operable, for example, to enable processing of transmitted and/or received WLAN based RF signals via the antenna subsystem 179 and one or more of the plurality of antennas 181a, . . . , 181b. The WLAN transceiver 175 is operable, for example, to perform amplification, filtering modulation and/or conversion processing operations to facilitate transmission and/or reception of RF signals at appropriate frequencies. The WiMAX transceiver 173 comprises suitable logic, circuitry and/or code that may enable performing WiMAX communications. The WiMAX transceiver 175 is operable, for example, to enable processing of transmitted and/or received WiMAX based RF signals via the antenna subsystem 179 and one or more of the plurality of antennas 181a, . . . , 181b. The WiMAX transceiver 175 is operable, for example, to perform amplification, filtering modulation and/or conversion processing operations to facilitate transmission and/or reception of RF signals at appropriate frequencies.

The cellular transceiver 175 comprises suitable logic, circuitry and/or code that may enable performing cellular communications. Exemplary cellular interfaces comprise GSM, UMTS, CDMA2000 and/or WCDMA. The cellular transceiver 175 is operable, for example, to enable processing of transmitted and/or received cellular based RF signals via the antenna subsystem 179 and one or more of the plurality of antennas 181a, . . . , 181b. The cellular transceiver 175 is operable, for example, to perform amplification, filtering modulation and/or conversion processing operations to facilitate transmission and/or reception of RF signals at appropriate frequencies. The GNSS transceiver 177 comprises suitable logic, circuitry and/or code that may enable performing GNSS communications. Exemplary GNSS interfaces comprise, for example, GPS, GLONASS and/or Galileo satellite systems based interfaces. The GNSS transceiver 177 is operable, for example, to enable processing of received GNSS based signals via the antenna subsystem 179 and one or more of the plurality of antennas 181a, . . . , 181b. The GNSS transceiver 175 is operable, for example, to perform amplification, filtering modulation and/or conversion processing operations to facilitate reception of RF signals at appropriate frequencies.

The antenna subsystem 179 comprises suitable logic, circuitry and/or code that may enable switching and/or routing of RF signals generated and/or processed via the cellular transceiver 175, the WLAN transceiver 171, the WiMAX transceiver 173 and/or the GNSS transceiver 177, which is transmitted and/or received via one or more of the plurality of antennas 181a, . . . , 181b. Each of the plurality of antennas

181a, ..., 181b comprises suitable logic, circuitry and/or code that enable transmission and/or reception of RF signals within certain bandwidths. For example, one or more of the plurality of antennas 181a, ..., 181b may enable RF transmission and/or reception via the 2.4 GHz, which is suitable for WiMAX, Bluetooth and/or WLAN RF transmissions and/or receptions. The plurality of antennas 181a, ..., 181b is communicatively coupled to the antenna subsystem 179.

In operation, the processing system 160 integrated in a communication device, for example the communication device 121, 123 and/or 125. The processing system enables performing wired and/or wireless based communication in the communication devices 121, 123 and/or 125, to facilitate network connectivity via one or more of the communication networks 111. In an exemplary aspect of the invention, the processing system 160 is also operable to facilitate and/or support generation and/or use of images sequences that are operable to facilitate simulating video streaming during video based connections sessions. For example, the user I/F subsystem 165 is operable to facilitate interactions with user to receive user's input and/or to prompt user for input when generating images that may subsequently be utilized in constructing images sequences. The user interactions may enable determining images that may be used and/or to determine any user specified preferences and/or adjustment. The processing system 160 is also operable to enable processing and/or maintaining of the images and/or the image sequences. For example, the biometric subsystem 167 is used to enable validation and/or tagging of pictures generated in the communication device 121, via the camera 131. Location information may also be utilized in generating tagging information corresponding to images and/or information utilized in generating images sequence. The location information may be determined based on reception of GNSS signals, received via the GNSS transceiver 177.

FIG. 2A is a block diagram that illustrates an exemplary image sequence storage element that enables simulating mouth movement, in accordance with an embodiment of the invention. Referring to FIG. 2A, there is shown an exemplary mouth image storage element 200. The exemplary mouth image storage element 200 comprises, for example, a plurality of still images representing a device user's mouth region while making various expressions and/or sounds. For example, the exemplary mouth image storage element 200 may comprise images corresponding to the mouth region of a user of the communication device 121 in various stages of opening, smiling, while pronouncing various letters and/or while making specific expression such as shock and/or frown.

In operation, the exemplary mouth image storage element 200 is generated and/or utilized to enable imitating mouth movement in order to facilitate simulated video streaming. For example, the camera 131 is operable in the communication device 121 to capture various images of a user's mouth during use of the device and/or during idle states. The captured sequence of images may be stored and utilized during subsequent communication sessions between the communication device 121 and other communication devices. The images are then combined into a singular storage element, the mouth image storage element 200 for example, to facilitate quick and convenient storage and retrieval operations. The exemplary mouth image storage element 200 is stored within the communication device 121 and/or external to the communication device 121, within the video support server 129, for example.

The generation of the exemplary mouth image storage element 200 may be performed ancillary to communicative operations during communication sessions. For example, because of the location of the camera 131 in the communication device 121 and/or the location of camera 151 in the communication device 125, images of the user's mouth may be taken during active calls using these devices without impacting the active calls. The images may be matched against captured audio streams in the devices, using speech recognition for example, and processed to enable proper identification of the individual images to particular letters, sounds and/or expression. The processed and labeled images are then stored into the exemplary mouth image storage element 200. The images may be labeled or tagged based on a location where they were captured and/or based on biometric information associated with a particular time they were captured. The generation of the exemplary mouth image storage element 200 may be performed during idle states based on, for example, a user request or a user profile. The communication device 121 is operable to utilize various interaction methods, for example audio and/or visual prompts outputted via the screen display 135, to facilitate capture of images of user's mouth region. The images are then used to create the exemplary mouth image storage element 200.

Figure 2B:
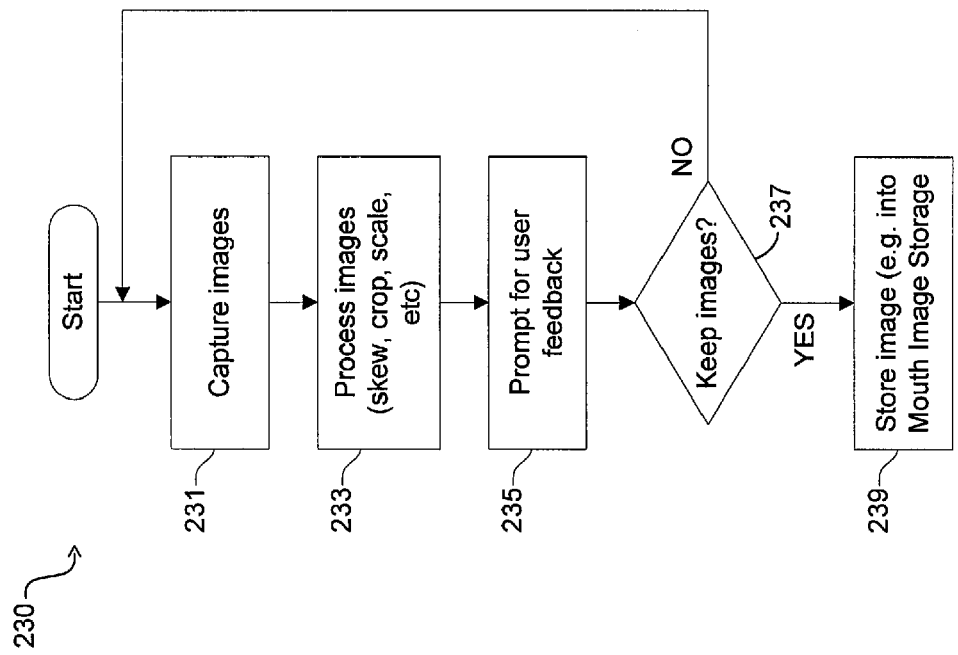
FIG. 2B is a flow chart that illustrates generation of image sequences via user based capture and prompt interactions, in accordance with an embodiment of the invention.

FIG. 2B is a flow chart that illustrates generation of image sequences via user based capture and prompt interactions, in accordance with an embodiment of the invention. Referring to FIG. 2B, there is shown a flow chart 230 comprising a plurality of exemplary steps, which may enable generation of images that are used to for simulating video streaming during communication sessions.

In step 231 user images are captured. For example, cameras 131, 141 and/or 151 may be utilized to capture images of devices users via communication devices 121, 123 and/or 125. The captures images show, for example, the face region. In an exemplary aspect of the invention, the mouth region may be emphasized since mouth movement is especially important to facilitate simulated video streaming corresponding to voice information. In step 233 the captured images are processed. For example, suitable logic, circuitry and/or code may be integrated into the communication devices 121, 123 and/or 125 to enable processing images captured via the cameras 131, 143 and/or 153. The processing operations enable enhancing the images to further emphasize, for example, mouth movement. Exemplary processing operations comprise skewing, cropping and/or scaling. In step 235 the user is prompted for feedback. For example, the captured images may be displayed via the screens 135, 145 and/or 155 in the communication devices 121, 123 and/or 125. The screens are utilized to prompt the user for feedback regarding the displayed images. The user feedback may comprise deleting the images, performing additional processing operations on the images and/or storage of the images for future use. In step 237, it is determined whether to keep the captured and processed images. The determination is based on user feedback and/or predetermined parameters and/or criteria. In instances where the images are not kept, the exemplary steps loop back to the start, and new images may be captured.

Returning to step 237, in instances where the images are kept, the exemplary steps proceeds to stop 239. In step 239, storage operations are performed on captured images. The captured images may be stored individually and/or within a singular storage element. For example, the captured images of the mouth region may be stored within the exemplary mouth image storage element 200, substantially as described with regards to FIG. 2A. The images may be stored internal within the communication device. The images may also be stored offline in an external entity, for example in the video support server 129.

Figure 2C:
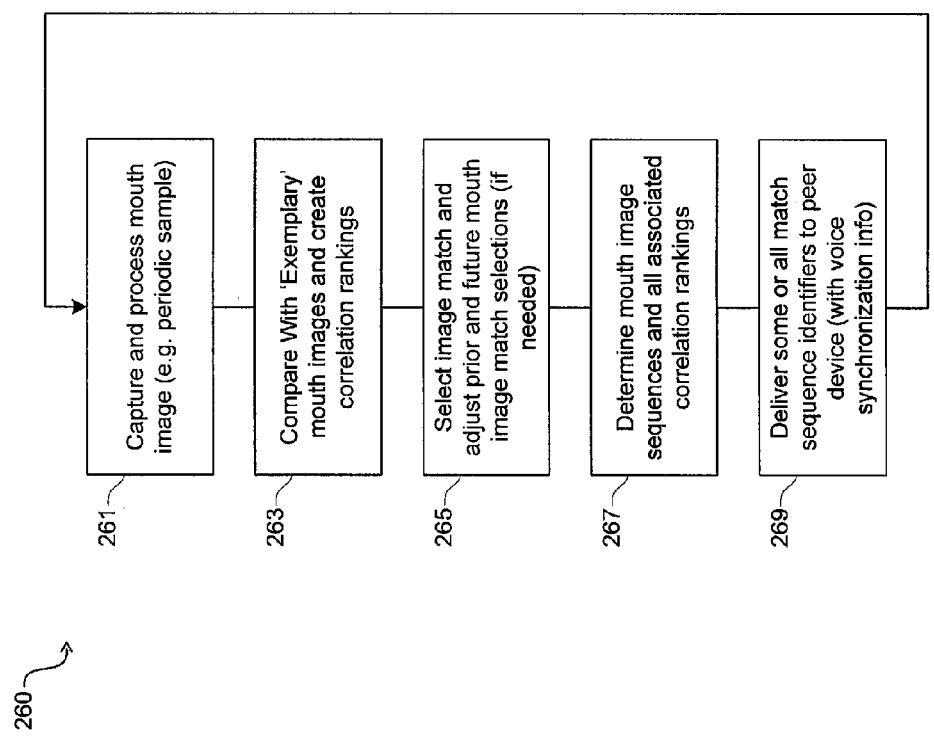
FIG. 2C is a flow chart that illustrates use, processing and updating of image sequences to enable simulated video streaming during active communication session, in accordance with an embodiment of the invention.

FIG. 2C is a flow chart that illustrates use, processing and updating of image sequences to enable simulated video streaming during active communication session, in accordance with an embodiment of the invention. Referring to FIG. 2C, there is shown a flow chart 260 comprising a plurality of exemplary steps, which may enable use of new and/or existing images to facilitate generation of simulated video streaming based on images sequences during communication sessions. The exemplary steps may be executed in a communication device, for example the communication device 121, during a communication session with other communication devices.

In step 261 images may be captured during a communication session. For example, because of the location of the cameras 131 and/or 151, mouth images may be captured and processed during calls. The capturing of images may be performed periodically, based on predetermined intervals. In step 263, the newly captured images are compared with existing images. For example, newly captured mouth images in the communication device 121 may be compared with existing mouth images, for example from the exemplary mouth image storage element 200. Correlation rankings between prior and new images are created. The correlation rankings enable determining usability of existing images and/or variations between existing and new images that correspond to the same sounds, letters and/or expressions. In step 265, images matches are made based on comparison between existing and new images and formulated correlation rankings. Additionally, sequencing criteria and/or parameters that may be utilized to facilitate forming images sequences may be adjusted if needed. In step 267, prior and/or future mouth image sequences and all associated correlation rankings are determined. For example, images sequences that are necessary to simulate video streaming corresponding to particular audio stream are determined. The utilized images may comprise newly captured images and/or preexisting images, which are stored within the device and/or externally via the video support server 129 for example. In step 269, image sequences related information, including voice synchronization info, is delivered to the destination device to facilitate generation of simulated video streams via the destination device. The information may comprise actual images where these images are within the source device, either as newly captured images and/or as internal stored preexisting images. Alternatively, image sequence identifiers may be sent to enable the destination device to use the needed images, for exampling by retrieving the images from the video support server 129. The exemplary steps may be repeated as voice stream is inputted via the source device.

Figure 3A:
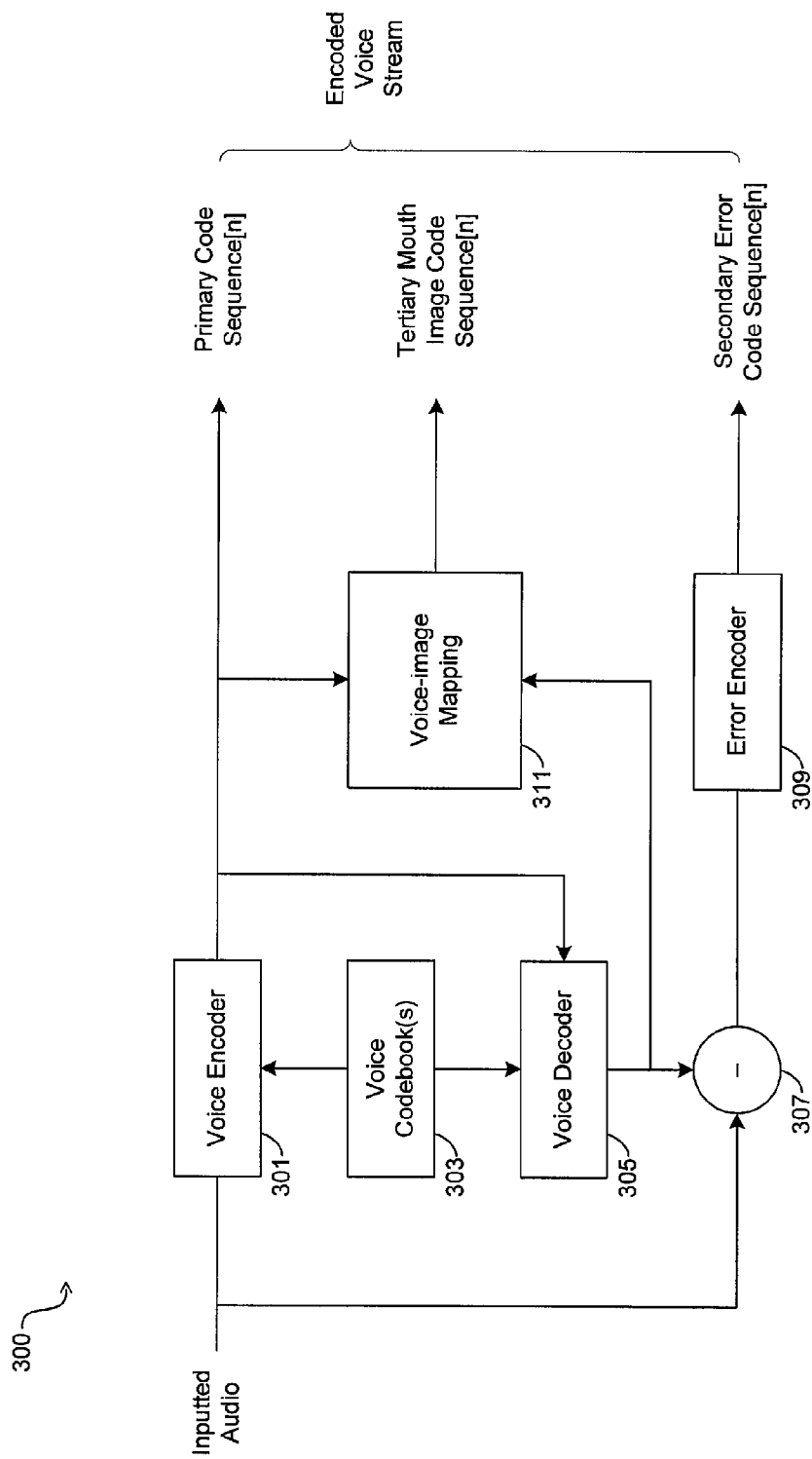
FIG. 3A is a block diagram that illustrates an exemplary voice processing system that enable addition of image sequences during voice encoding to facilitate video streaming, in accordance with an embodiment of the invention.

FIG. 3A is a block diagram that illustrates an exemplary voice processing system that enable addition of image sequences during voice encoding to facilitate video streaming, in accordance with an embodiment of the invention. Referring to FIG. 3A, there is shown a processing system 300, a voice encoder 301, a voice codebook storage 303, a voice decoder 305, a subtracting block 307, error encoder 309, and a voice-image mapping block 311.

The processing system 300 comprises the voice encoder 301, the voice codebook storage 303, the voice decoder 305, the subtracting block 307, the error encoder 309, the voice-image mapping block 311, and suitable logic, circuitry and/or code that enables processing inputted audio streams to generate voice stream with embedded image sequencing information.

The voice encoder 301 comprises suitable logic, circuitry and/or code that enable encoding voice data received via the inputted audio, based on one or more audio compression scheme. Exemplary audio processing schemes comprise adaptive multi-rate (AMR) coding, and variable bit rate coding. The voice encoder 301 may perform audio encoding processing operations via linear predictive coding (LPC). Encoding operations handled by the voice encoder 301 are performed utilizing voice codebooks which are retrieved from the voice codebook storage 303.

The voice codebook storage 303 comprises suitable logic, circuitry and/or code that enable storage and retrieval of data, including voice codebooks. The voice decoder 305 comprises suitable logic, circuitry and/or code that enable decoding voice streams encoded via the voice encoder 301. The subtracting block 307 comprises suitable logic, circuitry and/or code that enable subtracting two input signals and/or sequences.

The error encoder 309 comprises suitable logic, circuitry and/or code that enable encoding input signal based on specified encoding scheme. The error encoder 309 may implement the same encoding scheme used via the voice encoder 301. The voice-image mapping block 311 comprises suitable logic, circuitry and/or code that enable matching image sequence with the inputted audio stream.

In operation, the processing system 300 is utilized to enable performing voice encoding operations wherein image sequencing information may be embedded within the encoded voice stream. The processing system 300 is integrated, for example, into the communication devices 121, 123 and/or 125 to enable facilitating generation of image sequences that may be utilized to generated simulated video streams that corresponds to the voice information communicated via these devices. The voice encoder 301 is operable to encode voice data received, utilizing voice codebooks retrieved from the voice codebook storage 303, via the processing system 300, and generating corresponding primary voice code sequence. The encoded outputted from the voice encoder 301 may be decoded within the processing system 300, via the voice decoder 305. The decoded output is then subtracted from the inputted audio stream, via the subtracting block 307, to enable isolating possible error signals, which are then encoded via the error encoder 309 to generate a secondary error code sequence.

In an exemplary aspect of the invention, the voice-image mapping block 311 is utilized to match the inputted audio stream with image sequence. Various techniques are operable to enable performing the matching operations via the voice-image mapping block 311. For example, voice recognition may be utilized to enable matching voice information with corresponding images, based on proper identifiers of images in the exemplary mouth image storage element 200 for example. The matching may also be performed utilizing codebooks that are utilized to perform voice encoding. In an embodiment of the invention, in instances where a communication device is operable to enable simultaneous capturing of audio and video streams, matching operations may be performed during concurrent video and audio processing operations in the device, via interactions between the video and audio processing subsystems. The voice-image mapping block 311 outputs, for example, tertiary mouth image code sequence comprising image sequencing information which may comprise actual images and/or image identifiers that enable retrieval and/or construction of images by destination device. The primary voice code sequence, the secondary error code sequence and the tertiary mouth image code sequence are combined into a singular encoded voice stream, comprising voice information and embedded images sequencing data, which is then communicated to the destination communication device.

Figure 3B:
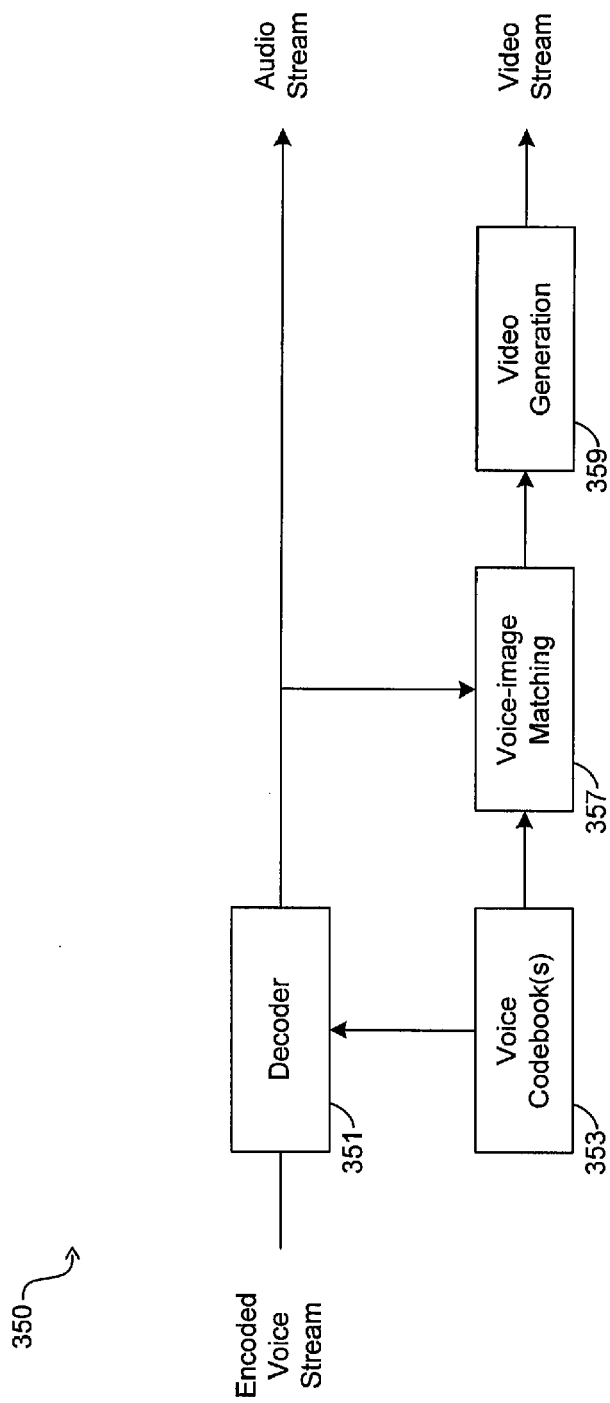
FIG. 3B is a block diagram that illustrates an exemplary voice processing system that enable construction of image sequences during voice decoding to facilitate video streaming, in accordance with an embodiment of the invention.

FIG. 3B is a block diagram that illustrates an exemplary voice processing system that enable construction of image sequences during voice decoding to facilitate video streaming, in accordance with an embodiment of the invention. Referring to FIG. 3B, there is show a processing system 350, a decoder 351, a voice codebook storage 353, a voice-image matching block 355, and a video generation block 357.

The processing system 350 comprises the decoder 351, a voice codebook storage 353, a voice-image matching block 355, and a video generation block 357, and suitable logic, circuitry and/or code that enables processing encoded voice streams with embedded image sequencing information.

The decoder 351 comprises suitable logic, circuitry and/or code that enable decoding inputted encoded voice stream which comprises voice information, and may also comprise additional data including, for example, error code sequences and/or image code sequences. The decoder 351 is operable, for example, to decode voice information encoded based on one or more audio compression schemes. Voice decoding operations via the decoder 351 are performed utilizing voice codebooks which are retrieved from the voice codebook storage 353. The voice codebook storage 353 comprises suitable logic, circuitry and/or code that enable storage and retrieval of data, including voice codebooks.

The voice-image matching block 355 comprises suitable logic, circuitry and/or code that enables matching image sequencing information with the decoded voice information extracted via the decoder 351. The voice-image matching block is operable to construct image sequences based on the matching operations. The video generation block 357 comprises suitable logic, circuitry and/or code that enable generation of simulated video streams utilizing constructed images sequences and/or based on sequencing criteria and information provided via the voice-image matching block 355.

In operation, the processing system 350 is operable to process received data that comprises voice information and to generate corresponding simulated video streams. The processing system 350 is integrated, for example, into the communication devices 121, 123 and/or 125 to enable constructing and/or processing of image sequences based on voice information to generate simulated video streams that correspond to, and are synchronized with the received voice information. The decoder 351 is operable to process, for example, encoded voice streams that is generated by the processing system 300. For example, voice information is extracted via the processing system 350, from the primary voice code sequences, utilizing voice codebooks retrieved from the voice codebook storage 353. The decoder 351 may also decode and process secondary error code sequences to reduce signal errors that may affect the voice information.

In an exemplary aspect of the invention, the voice-image matching block 355 is utilized to match extracted voice information with image sequences. Matching operations via the voice-image matching block 355 are performed, for example, based on image sequencing information embedded into the received encoded data, and extracted via the decoded 351, for example. Matching operations may also be performed by directly processing the extracted voice information. For example, voice recognition may be utilized to enable matching voice information with corresponding images, based on proper identifiers of images. The matching may also be performed utilizing codebooks that are utilized to perform voice encoding. The images maybe received from the sending device, retrieved from a centralized depository, for example the video support server 129, and/or may be accessed directly within the receiving device, for example where there has been a prior reception of video and/or pictorial data. The voice-image matching block 355 then construct image sequences that may enable generation of simulated video streams that correspond to, and are synchronized with audio streams that are generated based on the received voice information. The images sequences comprise, for example, a plurality of images that represent the user of the sending device, and are operable to simulate, for example, mouth movement. The video generation block 357 is then operable to perform video generation operations based on support video formats, and utilizing the image sequences and/or synchronization parameters and/or criteria as indicated by the voice-image matching block 355. While the invention has been described herein with regards to mouth movement, no such limitation is necessary, and the other embodiments of the invention enable utilizing other aspects to simulate video streaming. For example, facial expressions, including gesturing, frowning, and/or smiling, eye movement, lip movement, and/or other types of facial and/or bodily movement, which may be utilized based on biometric data for example, may also be utilized to simulate video streaming.

Figure 4:
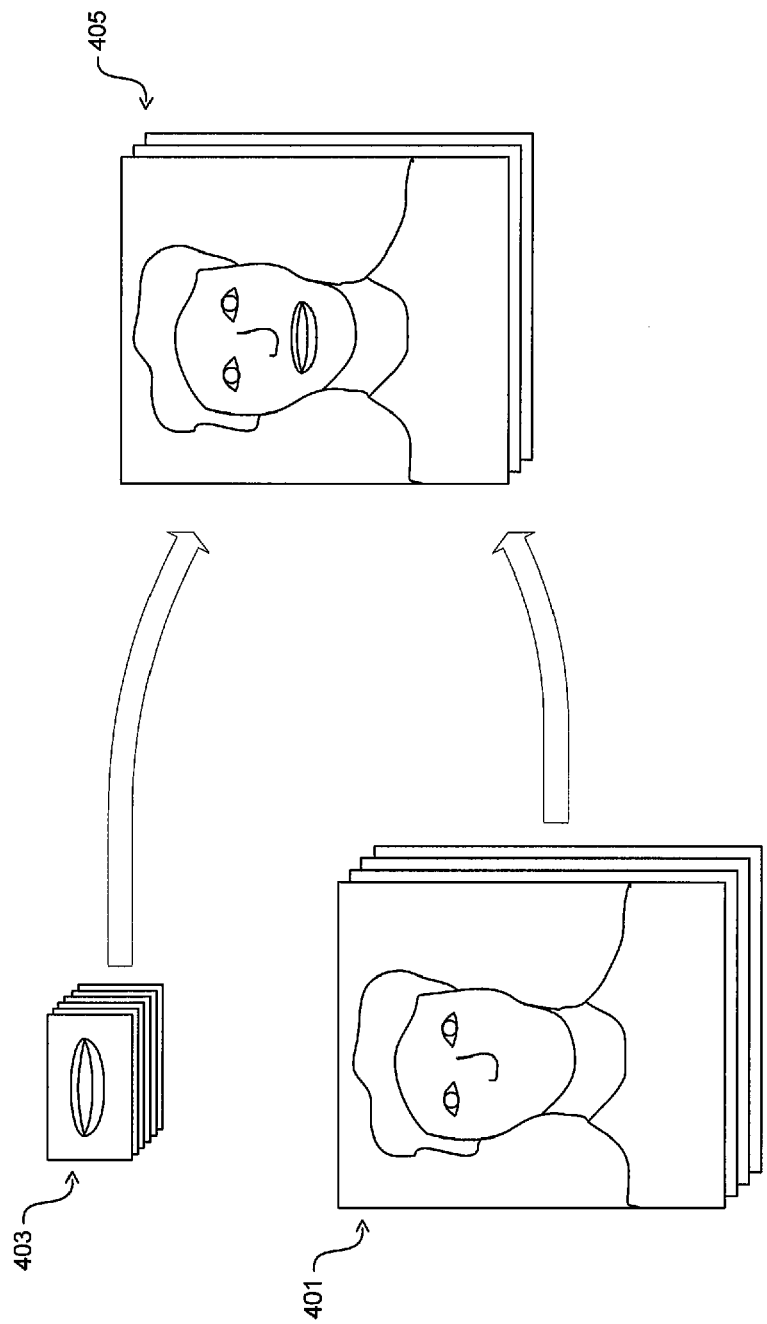
FIG. 4 is a block diagram that illustrates use of processed image sequences to generate simulated video streaming, in accordance with an embodiment of the invention.

FIG. 4 is a block diagram that illustrates use of processed image sequences to generate simulated video streaming, in accordance with an embodiment of the invention. Referring to FIG. 4, there is shown a plurality of reference images 401, a plurality of mouth position images 403, and a plurality of simulation images 405.

The plurality of reference images 401 comprises one or more images representing predominantly the face region of a user. Additionally, each of the images may also comprise a background region. The background region may be setup differently based on the context of use. For example, various backgrounds may be utilized during personal and/or work related calls. The images in the plurality of reference images may be ordered in sequential manner wherein consecutive images represent slight change in positioning of the face region of the user. Consequently, use of various images of the plurality of reference images 401 enables depicting user's head movement. The plurality of mouth position images 403 comprises images of the mouth region of a user. The plurality of mouth position images 403 may comprise, for example, the various images in the exemplary mouth image storage element 200. The images in the plurality of mouth position images 403 are utilized to enable imitating user's mouth movement corresponding to various sounds, letters, gestures and/or expressions.

In operation, the plurality of reference images 401 and plurality of mouth position images 403 are operable to construct the plurality of simulation images 405, which is utilized to generate a simulated video streaming corresponding to audio stream during playback operations. One or more images from the plurality of mouth position images 403 are superimposed over an image from the plurality of reference images 401 to simulate mouth movement. The selection of the proper mouth position image is performed based on various image matching operations, substantially as described, for example, with regard to FIGS. 1 and 3B. Different images from the plurality of reference images are utilized to imitate head movement for an added measure of realism. The change of reference image is performed either periodically and/or based on specified criteria that is determined by user feedback and/or predetermined parameters.

In an exemplary aspect of the invention, comic avatar based images are utilized to generate the simulated video streaming. Consequently, comic avatar based reference images and comic avatar based mouth position images are utilized to generate a plurality of comic avatar based simulated images in similar fashion.

Various embodiments of the invention may comprise a method and system for utilizing image sequences to perform video streaming during video conferencing. The communication devices 121, 123 and/or 125 are operable to construct one or more image sequences that correspond to voice information to simulate video streaming via the communication devices 121, 123 and/or 125. The image sequences are synchronized with the voice information utilizing one or more methods. The processing system 300 is operable, for example, to utilize speech recognition and/or voice codebooks based image mapping, via the voice-image mapping block 311, to match images with voice information. The images sequences are generated in the receiving communication device dynamically, are pre-generated and stored within the receiving communication device for subsequent use, and/or are retrieved from an external source. At least some of the images are generated via the sending communication device. The generated images are stored within the sending communication device and/or are stored in the video support server 129, where they may be retrieved by the receiving communication device.

User interactions are utilized, via the user I/F subsystem 165 in the processing system 160 for example, to enable tagging and/or labeling the images to facilitate matching and/or mapping operations, utilizing biometric and/or location information that are provided via the biometric subsystem 167 and/or the GNSS transceiver 177. The tagged images may be grouped during storage based on, for example, tagging information. Mouth position images are grouped, for example, in the exemplary mouth image storage element 200 to enable matching voice information with mouth images to facilitate simulating particular letters, sounds and/or expression. The images may be communicated directly during connection sessions, and/or alternatively, information that enable the retrieval of images or image sequences are communicated. The images and/or the information is encoded, for example, into the encoded voice stream, via the voice processing system 300, and the images and/or image information are then extracted via the processing system 350 in the receiving communication device. The communication devices 121, 123 and/or 125 are also operable to generate image sequence independently, by utilizing comic avatars, for example, to substitute for video streaming. In an exemplary embodiment, the image sequences comprise a plurality of reference frames 401, which is utilized as background that enable use of smaller and/or dedicated positional images to simulate one or more movements, expressions, and/or alterations. For example, the plurality of mouth position images 403 are utilized to simulate mouth movement during simulated video streaming.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing image sequences to perform video streaming during video conferencing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
constructing within a communication device, one or more image sequences corresponding to voice information, at least some of the image sequences including a plurality of mouth position images of the mouth of a user and a plurality of reference images, the plurality of reference images representing in part the face region of the user and a background region, the background region being user selectable, the plurality of reference images being ordered in sequential manner so that consecutive images represent changes in positioning of the face region of the user against the background region to simulate movement of the head of the user against the background region selected by the user, and wherein at least some images in said one or more image sequences are generated via a secondary communication device, which is operable to communicate with said communication device, based on voice information inputted via said secondary communication device, said secondary communication device being operable to add information during encoding of the voice information inputted via said secondary communication device that enables said construction of image sequences via said communication device;
synchronizing said one or more image sequences with said voice information; and
simulating video streaming utilizing said synchronized one or more image sequences during playback of said voice information.

2. The method according to claim 1, comprising retrieving said one or more image sequences by said communication device from memory within said communication device, from data received by said communication device, from a source external to said communication device, or from any combination thereof.

3. The method according to claim 1, wherein said generation of images is performed dynamically via said secondary communication device during communication with said communication device.

4. The method according to claim 1, wherein said generated images are stored within said secondary communication device or within a source external to said secondary communication device, or both, to enable use of said images during said construction of said one or more image sequences.

5. The method according to claim 1, wherein said generation construction, or both, is performed utilizing voice recognition based on user commands, or both.

6. A system for communication, the system comprising:
one or more circuits for use in a communication device that are operable to construct one or more image sequences corresponding to voice information, at least some of the image sequences including a plurality of mouth position images of the mouth of a user and a plurality of reference images, the plurality of reference images representing in part the face region of the user and a background region, the background region being user selectable, the plurality of reference images being ordered in sequential manner so that consecutive images represent changes in positioning of the face region of the user against the background region to simulate movement of the head of the user against the background region selected by the user, wherein at least some images in said one or more image sequences are generated via a secondary communication device, which is operable to communicate with said communication device, based on voice information inputted via said secondary communication device, said secondary communication device being operable to add information during encoding of the voice information inputted via said secondary communication device that enables said construction of image sequences via said communication device;

said one or more circuits are operable to synchronize said one or more image sequences with said voice information; and said one or more circuits are operable to simulate video streaming utilizing said synchronized one or more image sequences during playback of said voice information.

7. The system according to claim 6, wherein said one or more circuits are operable to retrieve said one or more image sequences by said communication device from memory within said communication device, from data received by said communication device, from a source external to said communication device, or from any combination thereof.

8. The system according to claim 6, wherein said generation of images is performed dynamically via said secondary communication device during communication with said communication device.

9. The system according to claim 6, wherein said generated images are stored within said secondary communication device within a source external to said secondary communication device, or both, to enable use of said images during said construction of said one or more image sequences.

10. The system according to claim 6, wherein said generation construction, or both, is performed utilizing voice recognition based on user commands, or both.

* * * * *